(12) United States Patent
Von Ahlen et al.

(10) Patent No.: US 10,137,989 B2
(45) Date of Patent: Nov. 27, 2018

(54) CONSTRUCTION KIT AND METHOD FOR A HOUSING STRUCTURE OF A MONUMENT FOR A VEHICLE CABIN

(71) Applicant: Airbus Operations GmbH, Hamburg (DE)

(72) Inventors: Tim Von Ahlen, Hamburg (DE); Daniel Hiebing, Hamburg (DE); Ansgar Josef Fennen, Hamburg (DE); Falk Bajorat, Hamburg (DE); Christian Lübbering, Hamburg (DE)

(73) Assignee: Airbus Operations GmbH (DE)

( * ) Notice: Subject to any disclaimer, the term of this patent is extended or adjusted under 35 U.S.C. 154(b) by 140 days.

(21) Appl. No.: 15/096,388

(22) Filed: Apr. 12, 2016

(65) Prior Publication Data

US 2016/0304206 A1    Oct. 20, 2016

(30) Foreign Application Priority Data

Apr. 15, 2015   (DE) .................. 10 2015 206 713

(51) Int. Cl.
*B64D 11/00*    (2006.01)
*B64D 11/04*    (2006.01)
(Continued)

(52) U.S. Cl.
CPC .............. *B64D 11/04* (2013.01); *B23P 15/00* (2013.01); *B29C 65/56* (2013.01); *B29C 65/62* (2013.01);
(Continued)

(58) Field of Classification Search
CPC ......... B64D 11/04; B64D 11/02; B23P 15/00; B29C 65/56; B29C 65/62; B29C 70/86;
(Continued)

(56) References Cited

U.S. PATENT DOCUMENTS 5,445,861 A     8/1995  Newton et al.
5,974,784 A *   11/1999 Feldman ................ B01D 53/94
                                                165/185
(Continued)

FOREIGN PATENT DOCUMENTS

DE         196 54 672 A1    2/1998
DE    10 2005 054 890 A1    5/2007
(Continued)

OTHER PUBLICATIONS

DE 10 2015 206 713.0 Search Report dated Apr. 11, 2016.

*Primary Examiner* — Assres H Woldemaryam
(74) *Attorney, Agent, or Firm* — Lerner, David, Littenberg, Krumholz & Mentlik, LLP (57) ABSTRACT

A construction kit for a housing structure of a monument for a cabin of a vehicle, in particular of an aircraft includes a plurality of integrally formed sandwich panels which each have two cover panels, which surround a core, and are formed with panel connecting structures which are each formed as a plug region or as a mating plug region. The mating plug region is formed so as to be complementary to the plug region in such a way that a plug region of a sandwich panel can be plugged into the mating plug region of another sandwich panel to connect the sandwich panels.

13 Claims, 4 Drawing Sheets

(51) Int. Cl.
| | |
|---|---|
| *B29C 65/00* | (2006.01) |
| *B64D 11/02* | (2006.01) |
| *B23P 15/00* | (2006.01) |
| *B29C 65/56* | (2006.01) |
| *B29C 65/62* | (2006.01) |
| *B29C 70/86* | (2006.01) |
| *B29C 65/48* | (2006.01) |
| *B29L 9/00* | (2006.01) |
| *B29L 31/30* | (2006.01) |

(52) U.S. Cl.
CPC ............ *B29C 66/124* (2013.01); *B29C 70/86* (2013.01); *B64D 11/02* (2013.01); *B23P 2700/01* (2013.01); *B29C 65/48* (2013.01); *B29C 65/562* (2013.01); *B29C 66/12425* (2013.01); *B29C 66/12443* (2013.01); *B29C 66/43* (2013.01); *B29C 66/43421* (2013.01); *B29C 66/54* (2013.01); *B29C 66/71* (2013.01); *B29C 66/721* (2013.01); *B29C 66/727* (2013.01); *B29C 66/7212* (2013.01); *B29C 66/72525* (2013.01); *B29C 66/73941* (2013.01); *B29K 2715/00* (2013.01); *B29L 2009/00* (2013.01); *B29L 2031/3005* (2013.01); *B29L 2031/3076* (2013.01); *B64D 2011/0046* (2013.01); *Y02T 50/46* (2013.01)

(58) Field of Classification Search
CPC ..... B29C 66/124; B29C 66/54; B29C 66/721; B29C 66/72525; B29C 66/7212; B29C 66/43; B29C 66/71; B29C 66/727; B29C 66/43421; Y02T 50/46
See application file for complete search history.

(56) References Cited

U.S. PATENT DOCUMENTS

| | | | | |
|---|---|---|---|---|
| 6,314,701 B1* | 11/2001 | Meyerson | ............... | E04C 2/292 52/309.9 |
| 6,591,568 B1* | 7/2003 | Panglsson | ............... | E04F 15/02 52/50 |
| 6,823,638 B2* | 11/2004 | Stanchfield | ............. | E04F 15/02 52/586.2 |
| 6,898,913 B2* | 5/2005 | Pervan | ................... | E04F 15/02 52/589.1 |
| 7,584,583 B2* | 9/2009 | Bergelin | ................. | E04F 15/02 52/177 |
| 7,641,414 B1* | 1/2010 | Joyce | ................... | A47B 47/042 403/231 |
| 7,802,415 B2* | 9/2010 | Pervan | ................... | E04F 15/04 428/50 |
| 8,245,477 B2* | 8/2012 | Pervan | ................... | B32B 21/02 52/592.1 |
| 8,403,266 B2 | 3/2013 | Fokken et al. | | |
| 8,528,859 B2 | 9/2013 | Gross et al. | | |
| 8,544,794 B2 | 10/2013 | Ciprian | | |
| 8,590,251 B2* | 11/2013 | Bandera | ............. | E04F 13/0876 52/545 |
| 8,769,904 B1* | 7/2014 | Brandt | ............. | E04F 15/02038 52/177 |
| 8,882,032 B2 | 11/2014 | Pangalila | | |
| 9,016,626 B2 | 4/2015 | Schliwa | | |
| 9,781,997 B2* | 10/2017 | Maertens | ............... | A47B 47/00 |
| 2002/0014302 A1 | 2/2002 | Fanucci et al. | | |
| 2002/0046526 A1* | 4/2002 | Knauseder | ................. | C09J 5/00 52/581 |
| 2002/0144767 A1 | 10/2002 | Johnson et al. | | |
| 2002/0157785 A1* | 10/2002 | Anderson | ........... | B29C 65/5042 156/304.3 |
| 2004/0060255 A1* | 4/2004 | Knauseder | ............... | E04F 13/10 52/582.2 |
| 2006/0038071 A1 | 2/2006 | Schoene | | |
| 2006/0080927 A1* | 4/2006 | Schulte | ............. | E04F 15/02161 52/592.1 |
| 2006/0179773 A1* | 8/2006 | Pervan | ..................... | B27N 7/00 52/592.1 |
| 2007/0238379 A1* | 10/2007 | Bhatnagar | ............. | F41H 5/0457 442/135 |
| 2008/0318000 A1* | 12/2008 | Horigome | ................. | B32B 3/12 428/116 |
| 2009/0072086 A1 | 3/2009 | Smith et al. | | |
| 2010/0006702 A1* | 1/2010 | Fogarty | ................. | B29C 65/505 244/131 |
| 2010/0009115 A1* | 1/2010 | Ruhdorfer | ................. | B32B 3/02 428/99 |
| 2010/0255251 A1 | 10/2010 | Le Roy | | |
| 2011/0206877 A1* | 8/2011 | Tada | ....................... | B32B 15/08 428/35.8 |
| 2011/0280655 A1* | 11/2011 | Maertens | ............... | A47B 47/042 403/375 |
| 2012/0040135 A1* | 2/2012 | Werthen | ..................... | B32B 3/08 428/138 |
| 2012/0119029 A1 | 5/2012 | Tappe et al. | | |
| 2012/0276320 A1* | 11/2012 | Zalewski | ............. | B29C 65/4835 428/61 |
| 2013/0276308 A1* | 10/2013 | Kang | ..................... | B21F 27/12 29/897 |
| 2014/0017001 A1* | 1/2014 | Maertens | ............... | A47B 47/042 403/376 |
| 2014/0096708 A1* | 4/2014 | Pherson | ............. | B65D 19/0002 108/56.3 |
| 2014/0302276 A1* | 10/2014 | Kusu | ..................... | B32B 27/12 428/113 |
| 2014/0302736 A1* | 10/2014 | Anandjiwala | ............. | C08J 5/045 442/255 |
| 2015/0165736 A1* | 6/2015 | Sattayatam | ............... | B32B 3/12 428/117 |

FOREIGN PATENT DOCUMENTS

| | | |
|---|---|---|
| DE | 10 2008 064 120 A1 | 7/2010 |
| DE | 10 2009 014 598 A1 | 9/2010 |
| DE | 10 2010 011 219 A1 | 9/2011 |
| EP | 2 436 599 A2 | 4/2012 |
| GB | 2 340 065 A | 2/2000 |
| WO | 98/09860 A1 | 3/1998 |
| WO | 2007/129887 A1 | 11/2007 |

\* cited by examiner

CONSTRUCTION KIT AND METHOD FOR A HOUSING STRUCTURE OF A MONUMENT FOR A VEHICLE CABIN

FIELD OF THE INVENTION

The present invention relates to a construction kit for a housing structure of a monument for a cabin of a vehicle and to a method for producing such a construction kit. In particular, the present invention relates to a monument for an aircraft cabin, for example of a passenger aircraft.

Although the present cabin monument and the associated construction kit and the associated method can be used in various types of vehicles, these and the problem addressed thereby are described in greater detail in relation to an aircraft cabin. In principle, however, the present invention can also be used in spacecraft, watercraft, rail vehicles or the like.

BACKGROUND OF THE INVENTION

In addition to the passenger seats, aircraft cabins of passenger aircraft also comprise fixtures which are provided for use by the crew or the passengers of the aircraft. Such fixtures in an aircraft passenger cabin comprise for example storage lockers, toilets, galleys, bar fixtures, dividing walls etc. and are also referred to as monuments. Due to the naturally restricted space available in aircraft cabins, such monuments have a very integrated and compact structure and are additionally frequently provided as integral modules.

Such monuments are typically anchored in a fixed position on the housing thereof in a corresponding installation position inside the aircraft cabin. For example, a metal perforated rail can be mounted on a housing upper surface of a monument by means of screws, which upper surface in turn can be fastened to a primary structure of the aircraft by means of additional metal components, such as mounting brackets, connecting rods or the like. In order to allow as flexible attachment as possible, such perforated rails can be provided with regularly spaced holes, in which the additional connection elements can be fixed in a longitudinal direction of the rail at regular intervals. Conventionally, such components for fastening monuments are produced from aluminium or a corresponding metal or metal alloy, for example by means of an extrusion process.

DE 10 2005 054 890 A1 and U.S. Pat. No. 8,528,859 B2 describe for example systems for fixing monuments in position in aircraft cabins, in which a plurality of individual metal components are used for fastening. The system from DE 10 2005 054 890 A1 thus provides a system carrier for fixing interior fitting components at the heads thereof, which is fastened to a fuselage by means of a plurality of formers and is equipped with a plurality of fastening means for connecting the interior fitting components. Furthermore, said system provides at least one fastening rail which is located in a cabin floor, which extends in parallel with the system carrier and along which are located corresponding fastening means for fixing the interior fitting components at the feet thereof.

However, for the purpose of weight reduction, the cabin components of modern passenger aircraft are increasingly constructed from fibre composite materials. For example, the housing walls of monuments are sometimes structured in sandwich constructions. In the case of the sandwich panels used here, a core structure made of synthetic polymer paper arranged in the manner of honeycomb, such as aramid paper or the like, is conventionally surrounded by plane-parallel cover layers which are applied on both sides. The cover layers can be formed for example by a fibre-reinforced plastics material, such as a glass-fibre-reinforced phenol resin or a carbon-fibre-reinforced epoxy resin. In this case, the core structure can alternatively also be formed from a rigid foam, such as a polymethacrylimide rigid foam (PMI rigid foam). Such designs of the walls of monument housings are characterised inter alia by a low weight, high stability and good heat- and/or sound-insulation properties. In contrast to these light composite components, the metal components of a monument fastening have a relatively high weight.

Finished sandwich panels can be processed further for the assembly of a monument housing, by inserting or adhering metal inserts to form screw-in connections, hinges, articulations or the like so that the panels can be interconnected. Further functions are typically likewise only installed retroactively in already finished sandwich panels, e.g. door-locking systems. Inter alia, ducts can be milled or drilled into the sandwich panels in order to be able to lay cooling pipes, electrical cables or the like.

Modern processes for producing sandwich panels are sometimes based on flow production. For example, U.S. 2002/0014302 A1 describes a pultrusion process for producing sandwich panels with integrated reinforcing elements. Furthermore, fibres or fibre layers can be sewed or introduced into the core of sandwich panels in order to further improve the rigidity and stability thereof.

BRIEF SUMMARY OF THE INVENTION

In view of the above, aspects of the present invention address the problem of providing a lightweight but stable, multifunctional monument housing for fixing in a vehicle cabin, which housing is composed of as few individual components as possible.

A construction kit for a housing structure of a monument for a cabin of a vehicle is provided accordingly. The construction kit comprises a plurality of integrally formed sandwich panels which each have two cover panels, which surround a core. Furthermore, the sandwich panels are formed with panel connecting structures which are each formed as a plug region or as a mating plug region. The mating plug region is formed so as to be complementary to the plug region in such a way that a plug region of a sandwich panel can be plugged into the mating plug region of another sandwich panel to connect the sandwich panels.

Furthermore, a monument for a cabin of a vehicle is provided. The monument comprises a housing structure which is formed with a construction kit according to the invention.

Furthermore, an aircraft or spacecraft comprising a cabin and a monument is provided, the housing structure of which is formed with a construction kit according to an embodiment of the invention. In this case, the construction kit further provides a fastening rail, which has a receiving space extending along the longitudinal direction of the fastening rail. The receiving space is designed to receive and fasten mounting feet of fixing elements to the fastening rail in order to fix the monument in position inside the cabin. The fastening rail is formed with rail-to-panel connecting structures, which are each formed as a plug region or as a mating plug region. The mating plug region of the fastening rail is formed so as to be complementary to the plug region of the sandwich panels, and the plug region of the fastening rail is formed so as to be complementary to the mating plug region of the sandwich panels, so that the fastening rail can be plugged together with sandwich panels. The aircraft or spacecraft further comprises a fixing element which is connected to a structure of the aircraft or spacecraft and has mounting feet. The mounting feet are mounted at a distance from one another in the fastening rail of the monument and fix the monument in a position inside the cabin by means of the fixing element.

Furthermore, a method for producing a construction kit for the housing structure of a monument for a cabin of a vehicle is provided. The method comprises the step of arranging two cover panels made of fibre composite semi-finished products around a core made of a foam to form a sandwich structure. Furthermore, the method comprises the step of inserting prefabricated panel connecting structures made of fibre composite semi-finished products in the sandwich structure to form plug regions or mating plug regions. Furthermore, the method comprises the step of impregnating the sandwich structure with a synthetic resin. Furthermore, the method comprises the step of curing the sandwich structure which is impregnated with synthetic resin, and forming a sandwich panel.

A fundamental idea of the present invention is to provide a construction kit for the construction of a monument housing in which a monument housing made of individual prefabricated components can be assembled, in which certain functions are already integrated during the production of the components.

A particular advantage of the solution according to an aspect of the invention is that it makes it possible to avoid elaborate secondary machining of components, for example of sandwich panels. For example, it is no longer necessary to introduce heavy metal inserts into the sandwich panels retroactively. In the present invention, the sandwich panels are already produced so as to be integral with connecting structures. Individual sandwich panels can be plugged together in the present invention simply by means of the connecting structures provided for this purpose. Since fewer individual parts are required, the structure of the monument is thus simplified, and the weight of the monument is reduced. As a result, not only fuel is saved hereby, but also in general, costs and installation expenditure are saved due to the simplified assembly. As a result of the omission of the previously required manual and time-consuming secondary machining of sandwich panels, the sources of error associated therewith are moreover eliminated, and thus the resulting significant fluctuations in quality of the finished components are prevented. Aspects of the present invention thus improve both the assembly of cabin monuments and the monuments themselves.

An additional advantage of the solution according to an aspect of the invention results when fixing monuments in a cabin of a vehicle. As a result of the fact that a fastening rail is provided in the construction kit, which rail can easily be plugged together with the sandwich panels, a means for fixing a monument in position is effectively already integrated in the housing of the monument. Said rail can be positioned and optimally designed in accordance with each monument. In this case, the fastening rail is thus used firstly as a fixing interface of the monument. Secondly, a fastening rail of this type reinforces the structure of the corresponding housing side of the monument and thus the monument per se. Complex fastening constructions comprising heavy external perforated rails or the like are rendered superfluous by aspects of the present invention.

Advantageous embodiments and developments are set out in the description with reference to the figures.

In one development of the construction kit, the connecting structures can be in the form of pins (plug region) or complementarily shaped slots (mating plug region). Alternatively, additional connecting structures which are known to a person skilled in the art are also provided in this case, such as tongues, prongs or springs as the plug region and corresponding grooves as the mating plug region. The connection itself can be in the form of an interlocking connection or for example a frictional connection. In addition to purely mechanical connections (e.g. a tongue-and-groove joint, a dovetail joint or a snap-fit closure), additional connecting closures can also be advantageous as a complement to the basic connection, e.g. adhesive connections (material bonds).

According to one development of the construction kit, reinforcement fibres and/or layers of reinforcement fibres can be provided in the core of the sandwich panels. The density distribution of the reinforcement fibres can be increased at the plug regions and/or the mating plug regions. Accordingly, in one development of the first step, the method can comprise sewing up the core with a plurality of reinforcement fibres and/or introducing a plurality of layers of reinforcement fibres. For example, carbon fibres or the like having variable thicknesses and rigidities can be introduced into the core in an automated process. The precise distribution of the fibres and in particular the density distribution thereof can be accordingly variably optimised in such a way that such regions in which high loading of the components is to be expected are permeated by fibres to a particularly great extent. This relates in particular to regions which are adjacent to the connecting structures, i.e. the plug or mating plug regions, or a fastening rail. For example, in pultrusion processes, it is possible to also insert reinforcement fibre layers in the components. Likewise, it is possible to introduce and/or sew in individual reinforcement fibres in different orientations and arrangements. In regions in which lower loading is to be expected, accordingly fewer fibres or fibre layers can be introduced or said fibres or fibre layers can be omitted completely. In general, depending on the intended application of each monument, reinforcement fibres can be introduced into the monument components in an optimum manner during production. Alternatively or additionally, it is moreover possible to design the foam core of the sandwich panels to be flexible. For example, the foam density can be mapped out in a variable manner over the panel surface area, e.g. by a variable arrangement of different foam layers etc.

According to one development of the construction kit, elongate hollow spaces can be provided in the core of the sandwich panels. The hollow spaces can each extend through the core in a direction which is substantially parallel to the cover panels. In one development of the first step, the method can accordingly comprise forming elongate hollow spaces in the core of the sandwich structures. Hollow spaces of this type are required for implementing different systems, e.g. door systems, electrical installations comprising cables or the like, ventilation or air-conditioning system pipes, fire-protection or extinguishing means, water pipes etc. For example, in pultrusion processes or other flow production processes, it is possible to introduce individual foam layers having different densities and geometric designs in a desired arrangement into the core of the sandwich panels. Alternatively, prefabricated foam cores can also be used, which are have already been produced with the desired hollow spaces, e.g. in an extrusion process. In the present invention, hollow spaces of this type are accordingly incorporated during the production of the sandwich panels and thus no longer have to be installed in the secondary machining in an elaborate and cost-intensive manner, or no pipes etc. have to be mounted in the monuments separately in addition to the panels.

According to one development of the construction kit, at least two of the sandwich panels can be formed integrally with one another to form a monument component. According to one development of the method, said method can accordingly comprise the step of plugging together a plurality of sandwich structures by means of the plug regions and the mating plug regions. The curing of the sandwich structures which are impregnated with synthetic resin and plugged together can comprise forming an integral monument component. In this development, the sandwich structures can be interconnected during the production of the sandwich panels, i.e. before the curing thereof. In addition to a purely mechanical connection, the subsequent impregnation and curing then provide integral bonding of the individual sandwich panels to one another. In this development, it is accordingly possible, in addition to substantially two-dimensional panels, to additionally produce generally three-dimensional monument components in an integral manner, for example shell-shaped components or right-angled connections of two (or more) sandwich panels to form a lateral edge of a monument. In particular, the number of individual components required for the housing structure of a monument is drastically reduced hereby.

According to one development of the construction kit, a fastening rail can be provided which has a receiving space extending along the longitudinal direction of the fastening rail. The receiving space can be designed to receive and fasten mounting feet of fixing elements to the fastening rail in order to fix the monument in position inside the cabin. The fastening rail can be formed with rail-to-panel connecting structures, which are each formed as a plug region or as a mating plug region. The mating plug region of the fastening rail can be formed so as to be complementary to the plug region of the sandwich panels, and the plug region of the fastening rail can be formed so as to be complementary to the mating plug region of the sandwich panels, so that the fastening rail can be plugged together with sandwich panels.

For example, the fastening rail can be formed in such a way that the fastening rail and one or both cover panels of the sandwich panels are flush at the outer face or faces. In this case, the fixing interface of the monument in the cabin would thus advantageously already be space-efficient and incorporated in the monument in an unobtrusive manner.

At the connecting structures, the fastening rail can additionally be adhered together with the sandwich panels. Accordingly, the sandwich panels themselves can also be adhered to one another at the connecting structures. For example, the sandwich panels can be components made of fibre-reinforced plastics material which are adhered to a fastening rail made of plastics material or metal.

The fastening rail can be formed with a plurality of regularly spaced holes in the receiving space. The holes can be designed to receive and fasten mounting feet of fixing elements to the fastening rail. Both the holes and the mounting feet can be standardised. In this development, fixing elements can consequently be attached to the monument in a particularly flexible and variable manner. The monument can thus be attached in an aircraft cabin differently according to the respective needs or conditions.

The fastening rail can, for example, be formed as a seat rail. In contrast to the perforated rails conventionally used for fixing monuments in position, seat rails are designed to be considerably lighter and more space-efficient. In particular, standardised seat rails can be used so that no specific cost-intensive solutions are required for each fastening. The seat rail advantageously further provides prefabricated and standardised holes, via which corresponding mounting feet can be attached to the fastening rail. For example, the "fittings" made of plastics material or metal which are conventionally used to fasten seats can be used. This could then be fixed in a desired position, e.g. by means of screws, studs, adhesive connections, twist locks etc. In principle, the conventional mounting methods which are known to a person skilled in the art can be used for fixing the mounting feet, as are also used in the case of other fields of application of fastening rails, for example seat rails.

The fastening rails can be formed substantially from fibre-reinforced plastics material. Furthermore, at least two of the sandwich panels can be formed integrally together with a fastening rail located therebetween to form a monument component. The step of plugging together can comprise introducing a fastening rail made of a fibre composite semi-finished product comprising prefabricated rail-to-panel connecting structures. In this case, the rail-to-panel connecting structures can form plug regions or mating plug regions. Furthermore, the step of plugging together can comprise plugging together the fastening rail with sandwich structures. In this development, monument components can be integrally formed which already contain the fastening rail as a fixing interface, i.e. the fastening rail is formed integrally with one or more sandwich panels. In this case, the fastening rail is used both as a fixing interface for fixing the monument in position in a vehicle cabin and as a connection interface between sandwich panels. This has the considerable advantage that the fastening rail can be produced integrally with the sandwich panels during the production thereof, e.g. in a continuous production process such as pultrusion. The fastening rail can thus also be laminated into the sandwich panels to a certain extent. In this development, the monument can be produced to be particularly lightweight and economical.

The configurations and developments above can be combined with one another as desired where appropriate. Further possible configurations, developments and implementations of the invention also do not comprise explicitly mentioned combinations of features of the invention described previously or in the following with respect to the embodiments. In particular in this case, a person skilled in the art will also add individual aspects as improvements or supplements to each basic form of the present invention.

BRIEF DESCRIPTION OF THE DRAWINGS

The present invention will be described in greater detail below on the basis of the embodiments shown in the schematic drawings, in which.

DETAILED DESCRIPTION

The accompanying drawings are intended to provide further understanding of possible embodiments of the invention. They illustrate embodiments and are used, in conjunction with the description, to explain principles and concepts of the invention. Other embodiments and many of the above-mentioned advantages emerge from the drawings. The elements of the drawings are not necessarily shown to scale with respect to one another. In the figures of the drawings, elements, features and components which are like, functionally like or have the same effect—unless otherwise specified—are each provided with the same reference numerals.

Figure 1:
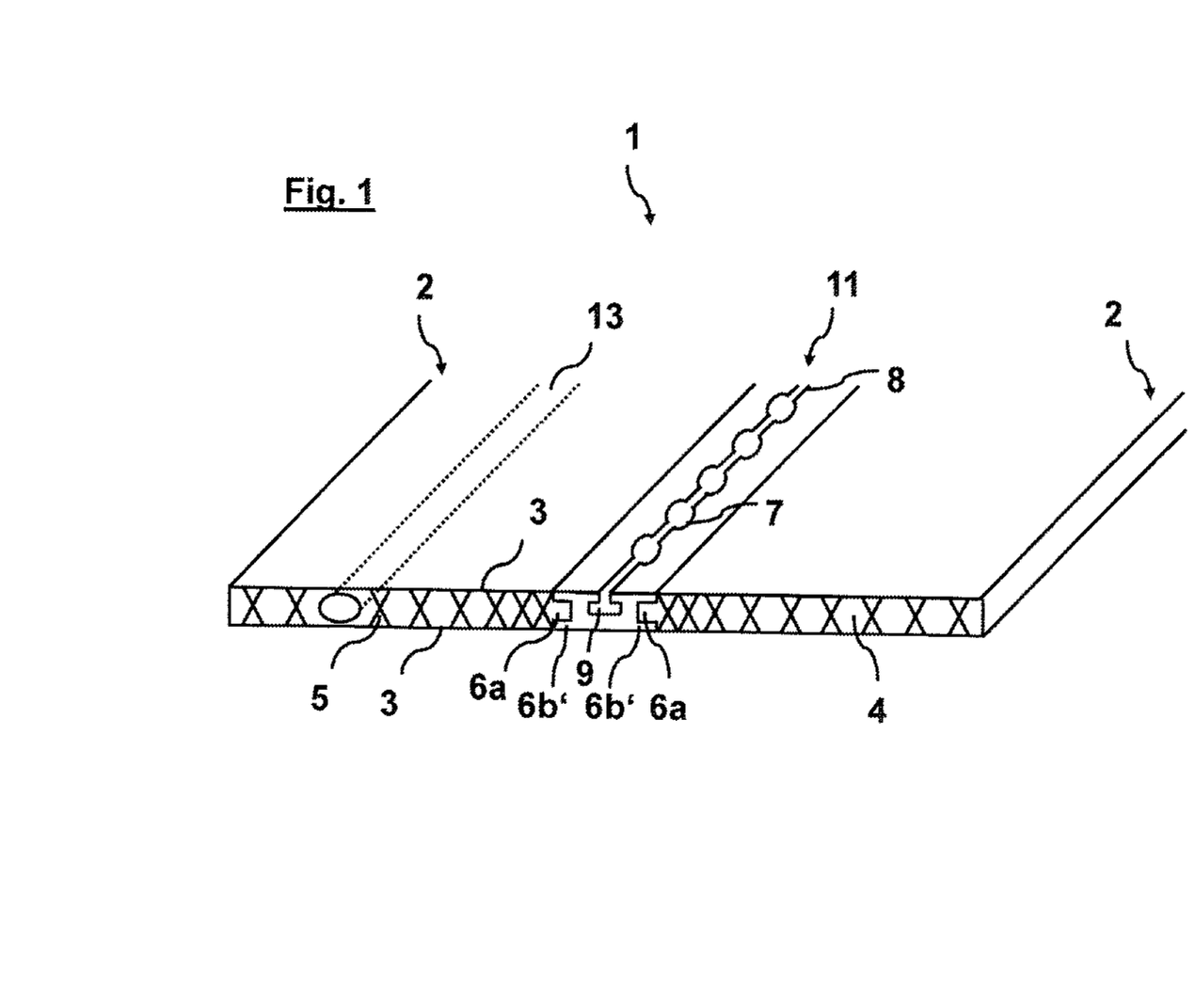
FIG. 1 is a schematic perspective view of a construction kit according to an embodiment of the invention for a housing structure of a monument according to one embodiment of the invention.

FIG. 1 is a schematic perspective view of a construction kit according to an embodiment of the invention for a housing structure of a monument according to one embodiment of the invention.

Figure 3:
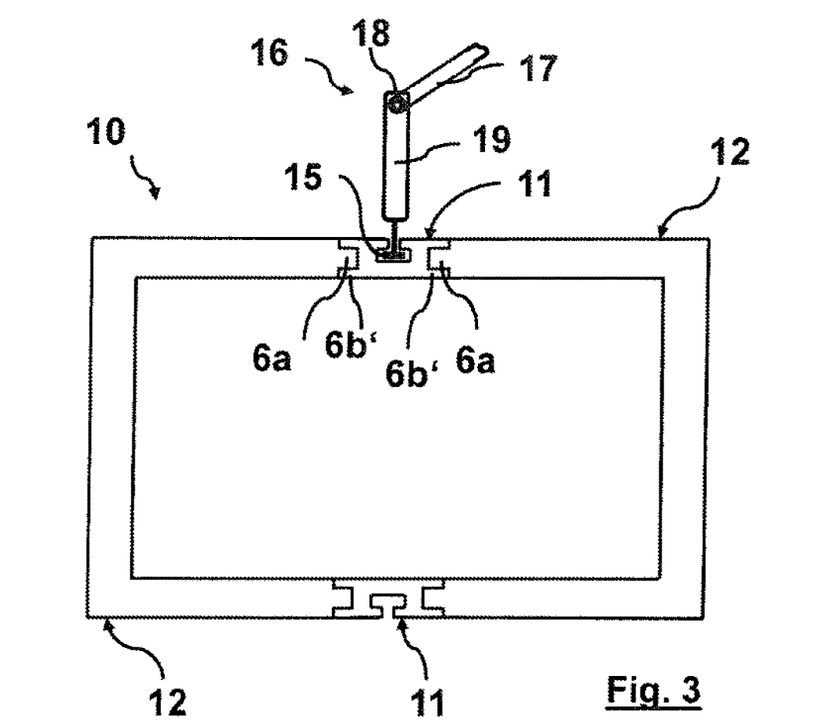
FIG. 3 is a schematic cross-sectional view of a monument which is constructed with the construction kit from FIG. 1.
Figure 4:
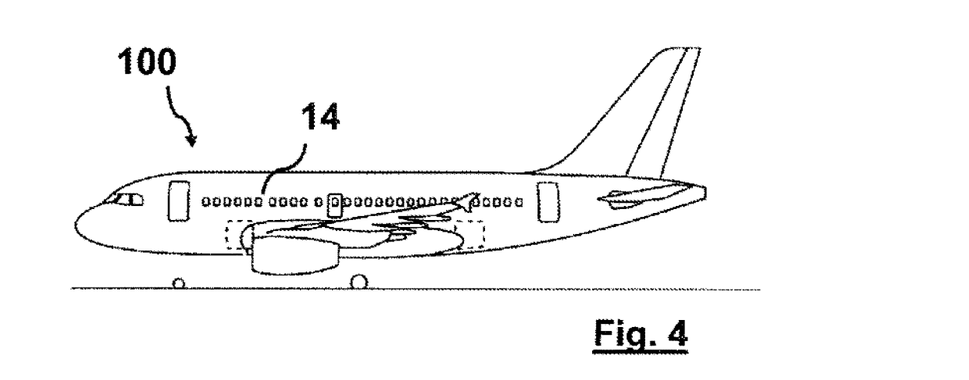
FIG. 4 is a schematic side view of an aircraft comprising a cabin in which the monument from FIG. 3 is fixed.

In FIG. 1, the reference sign 1 denotes a construction kit for a housing structure of a monument 10 for the cabin of an aircraft 100, for example of a passenger aircraft. By way of example, such an aircraft 100 is shown in FIG. 4, in which the position of a cabin 14 is indicated (in this case, the cabin is a passenger cabin). An example of a monument 10, which is constructed with the construction kit 1 from FIG. 1, is shown schematically in a cross-sectional view in FIG. 3. The monument 10 in FIG. 3 is fastened to a structure (not shown) of the aircraft from FIG. 4. The structure can be a primary structure of the aircraft, for example an attachment point of an aircraft former which fixes the monument 10 in a position in the aircraft cabin 14. The monument 10 in FIG. 3 is described in detail further below.

In the embodiment shown in FIG. 1, the construction kit 1 comprises integrally formed sandwich panels 2 and fastening rails 11, which form a construction system composed of individual components to form the structure of a monument housing. The sandwich panels 2 in this case form the housing walls of the monument 10. The fastening rails 11 are plugged together with the sandwich panels 2 and are used to fix the monument 10 in the cabin 14.

Each sandwich panel 2 comprises two cover panels 3 in each case, which panels surround a core 4. Furthermore, each sandwich panel 2 is formed with connecting structures which are each formed as a plug region 6a or as a mating plug region 6b. The fastening rail 11 is also formed with connecting structures of this type (plug regions 6a' and/or mating plug regions 6b'). For the sake of simplicity, in FIG. 1, only one connecting structure (in each case a plug region 6a) is drawn in for each sandwich panel 2, whereas the fastening rail 11 comprises two connecting structures of this type (two mating plug regions 6b'). In principle, however, the sandwich panels 2 can comprise a plurality of connecting structures of this type. In principle, in other embodiments, the fastening rail 11 can also be formed with another number of connecting structures in a different arrangement and design.

In this case, the mating plug region 6b' is formed so as to be complementary to the plug region 6a in such a way that a connecting structure which is formed as a plug region 6a can be plugged into a connecting structure which is formed as a mating plug region 6b' in order to connect two components. For example, the plug region 6a can be in the form of a tongue, a protrusion or a pin, whereas the mating plug region 6b' can be in the form of a complementarily shaped groove, recess or slot. In another embodiment, the plug region 6a can be available for example as a latching portion, and the mating plug region 6b' accordingly as a mating latching portion. In principle, in this embodiment of the construction kit 1, sandwich panels 2 can be connected to one another and to fastening rails 11 by means of the connecting structures, in that these are simply plugged into one another. In addition, it is provided that the plug-in connection is adhered in order to rigidly fix two components to one another in each case. Depending on the design of the connecting structures, however, this can also be superfluous, due to the fact that the specific design of the connecting structures themselves already allows a rigid connection of two components. In principle, the construction kit 1 shown in FIG. 1 opens up the possibility of assembling complex housing structures of monuments 10.

The cover panels 3 of the sandwich panels 2 can be formed for example by a fibre-reinforced plastics material, such as a glass-fibre-reinforced phenol resin or a carbon-fibre-reinforced epoxy resin. In the embodiment shown, the core structure 4 is formed from a rigid foam, for example a PMI rigid foam. Alternatively or additionally, the core 4 can also comprise polymer paper arranged in the manner of honeycomb, e.g. an aramid paper or the like. Such designs of the walls of monument housings are characterised inter alia by a low weight, high stability and optimum heat- and/or sound-insulation properties.

Sandwich panels 2 from the embodiment shown in FIG. 1 can be produced for example in a flow production, e.g. in a pultrusion process. In this case, two cover panels 3 made of fibre composite semi-finished products are arranged around a core 4 made of a rigid foam to form a sandwich structure. Prefabricated connecting structures made of fibre composite semi-finished products can then be inserted in the sandwich structure from the side in order to form plug regions 6a and mating plug regions 6b. Next, the sandwich structure can be impregnated with a synthetic resin and subsequently cured to produce a sandwich panel 2.

Furthermore, the sandwich panels 2 shown in FIG. 1 can comprise reinforcement fibres 5 (e.g. carbon fibres) and/or layers of reinforcement fibres 5 or the like, which are sewn into or inserted in the core 4. In principle, reinforcement fibres 5 of this type can also be wrapped around the core 4. The reinforcement fibres 5 having an increased density can be arranged specifically in the plug regions 6a and/or the mating plug regions 6b or in other regions with high loading in order to better reinforce said regions. In the production of the sandwich panels 2, reinforcement fibres 5 of this type can be introduced in a fully automated manner before being impregnated and cured.

Furthermore, one of the sandwich panels 2 in FIG. 1 is shown provided with an elongate hollow space 13 by way of example. The hollow space 13 extends through the core 4 of the sandwich panels 2 in a direction which is parallel to the cover panels 3 and parallel to the connecting structure from one end to the other end of the sandwich panels 2. A hollow space 13 of this type can be formed even during the production of the sandwich panels 2 by correspondingly shaping the foam. For example, the foam can be arranged in layers in such a way that a hollow space 13 is produced. The hollow space 13 can be used for various purposes. Thus for example cable ducts, ventilation pipes or supply pipes can lead through the hollow space 13 and as a result be integrated in the sandwich panels 2, i.e. the housing walls of the monument 10.

The fastening rail 2 is designed for fastening fixing elements 16. For this purpose, the fastening rail 2 has a receiving space 9 extending along a longitudinal direction of the fastening rail 2. Holes 7 lead into the receiving space 9, which holes are designed in such a way that associated mounting feet 15 of a fixing element 16 can be mounted. For example, the fastening rail 2 can be designed corresponding to a seat rail or can correspond to such a rail. The fastening rail 2 can thus be for example a component in which a plurality of holes 7 and slots 8 are introduced at regular intervals and so as to be interconnected. The fastening of fixing elements 16 to the fastening rail 11 will be described in greater detail further below with reference to FIG. 3.

The fastening rail 11 can be a component made of a plastics material. Said rail can be produced for example in an injection moulding process. Furthermore, the fastening rail 11 can also be reinforced with fibres (e.g. glass or carbon fibres), which have been integrally bonded with a plastics material (e.g. a synthetic resin) in a pultrusion process or the like. Alternatively, however, the fastening rail 11 can also be produced from aluminium or an aluminium alloy by means of an extrusion process.

In FIG. 1, finished sandwich panels 2 are shown which are plugged together with a fastening rail 11 (optionally with an additional adhesive bond). By means of this plug construction kit 1, in principle a complete housing structure of a monument 10 can be assembled. Alternatively however, for this purpose, the mentioned components can also be joined during the production process, i.e. in particular before being impregnated with synthetic resin and subsequently being cured. In this case, corresponding semi-finished products of the components are plugged together, jointly impregnated and then cured. As a result, integral monument components 12 composed of a plurality of sandwich panels 2 are consequently provided with or without an integrated fastening rail 11.

Figure 2:
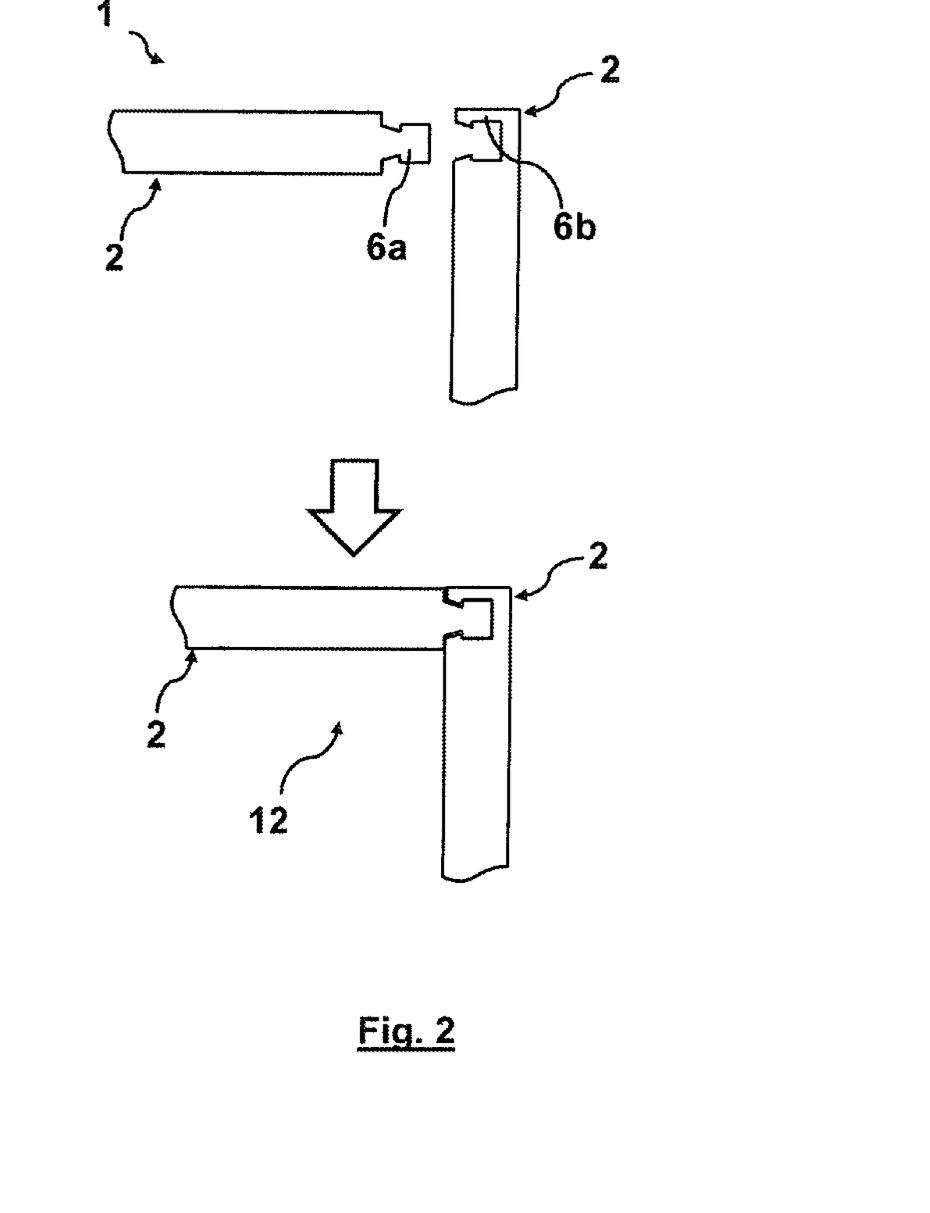
FIG. 2 is a schematic cross-sectional view of two sandwich panels of the construction kit from FIG. 1 before and after the connection of the sandwich panels.

FIG. 2 is a schematic cross-sectional view of two sandwich panels 2 of the construction kit 1 from FIG. 1 before (above) and after (below) the connection of the sandwich panels 2. The two sandwich panels 2 are fastened to one another via the plug regions 6a and mating plug regions 6b thereof, so that together, they form a monument component 12. This can be carried out before or after the impregnation with synthetic resin and the curing.

FIG. 3 is a schematic cross-sectional view of a monument 10, which is constructed with the construction kit 1 from FIG. 1 and is fixed in position in a cabin 14 (not shown) of an aircraft 100. In the embodiment shown in FIG. 3, the monument 10 is a box-shaped fixture for an aircraft cabin 14. In this case, the monument can be for example a storage locker or a galley or the like. In principle, the solution according to the invention can be applied to various monuments which are to be positioned in an aircraft cabin 14 in a stationary manner. Inter alia, the monument 10 is composed of a plurality of monument components 12 and fastening rails 11. In this case, the fastening rails 11 are flush with an outer housing side. The monument components 12 can have been produced for example as in FIG. 2 and then connected by means of connecting structures (plug regions 6a and mating plug regions 6b') to the fastening rails 11.

The embodiment of a fixing element 16 which is shown in FIG. 3 comprises a pivot bearing 18, on which connecting struts 19 are mounted, which in turn are each attached to the fastening rail 11 by means of a mounting foot 15. A tension rod 17 is mounted in the pivot bearing 18, which rod is rigidly connected to a structure of the aircraft 100. The mounting feet 15 are shaped so as to correspond to the holes 7 in the fastening rail 11. In the case where the fastening rail 11 is designed so as to correspond to a seat rail, the mounting feet 15 can be fittings made of plastics material or metal, for example in the form of a slide such as is also used for fastening aircraft seats or similar components. Such fittings can be attached in a slidably displaceable manner for mounting on a rail. For example, there are fittings, the lower surface of which is shaped so as to precisely fit a portion consisting of holes 7 and slots 8 of the seat rail so that the fitting can be introduced into the receiving space 11 of the seat rail in a desired position. By means of light subsequent shifting, the fitting can be brought into a locked position, in which, due to the shape of the lower surface thereof, it cannot be lifted upwards out of the receiving space of the seat rail again (without shifting once more). In such a position, the fitting can be secured for example by means of a setting screw or a lever device and thus rigidly connected to the seat rail.

The connecting struts 19 can be formed for example from fibre-reinforced plastics material. For example, the connecting struts 19 can be pultruded, hollow or solid carbon profiles, i.e. can consist of carbon-fibre-reinforced plastics material (CFRP). Alternatively, embodiments made of metal, such as aluminium or titanium, are provided in any case. The connecting struts 19 can be bonded for example to the pivot bearing 18 and to the mounting feet 15 and/or fastened by means of interference fits, screw-in connections or the like. The connecting struts 19 can comprise reinforcing structures, such as longitudinal ribs or the like. The pivot bearing 18 can be a simple metal component, such as are known to a person skilled in the art from various other applications. The tension rod 17, for example an extruded aluminium part, can be pivotally mounted in a hole in the pivot bearing in this case by means of a pin or the like. Furthermore, the tension rod 17 can have a symmetrical design, wherein a corresponding connection on the other side of the tension rod 17 is closed by the primary structure of the aircraft 100.

Figure 5:
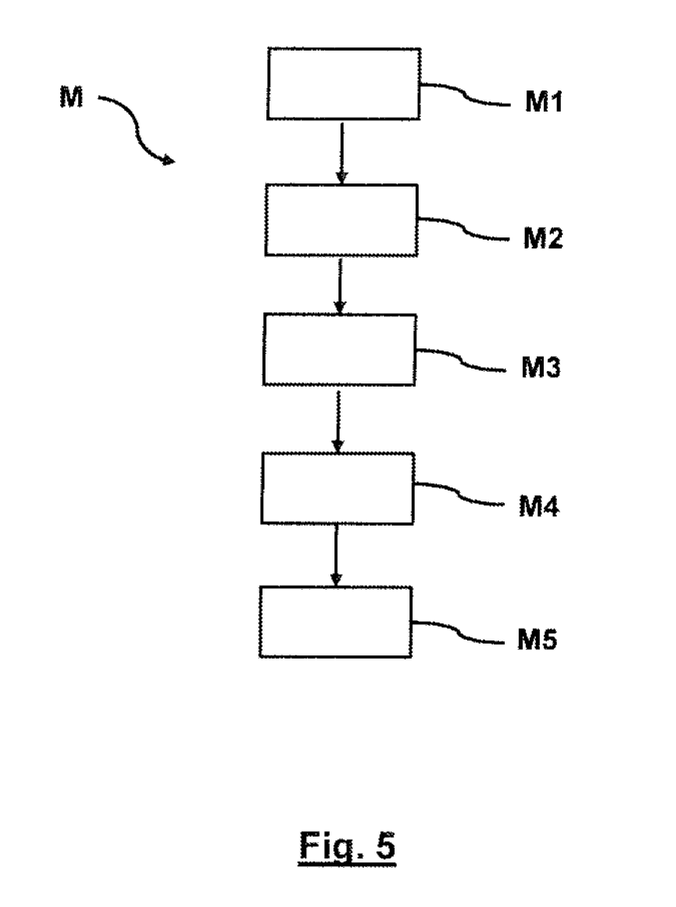
FIG. 5 shows a schematic flow chart of a method according to the invention for producing the construction kit from FIG. 1.

FIG. 5 shows a schematic flow chart of a method M according to the invention for producing the construction kit 1 from FIG. 1.

In a first step under M1, the method M comprises arranging two cover panels 3 made of fibre composite semi-finished products around a core 4 made of a foam to form a sandwich structure. This step can further comprise sewing up the core 4 with a plurality of reinforcement fibres 5 and/or introducing a plurality of layers of reinforcement fibres 5. The density distribution of the reinforcement fibres 5 in the core 4 can be increased in the region of the plug regions 6a and/or the mating plug regions 6b. Furthermore, in this step, elongate hollow spaces 13 can additionally be formed in the core 4 of the sandwich structures, which hollow spaces each extend through the core 4 in a direction which is substantially parallel to the cover panels 3.

In a second step under M2, the method further comprises inserting prefabricated panel connecting structures made of fibre composite semi-finished products in the sandwich structure to form plug regions or mating plug regions.

In a third step under M3, the method can comprise plugging together a plurality of sandwich structures by means of the plug regions 6a and the mating plug regions 6b. This step can alternatively or additionally comprise introducing a fastening rail 11 made of a fibre composite semi-finished product comprising prefabricated rail-to-panel connecting structures. The rail-to-panel connecting structures can form plug regions 6a' or mating plug regions 6b'. Accordingly, this step can further comprise plugging together the fastening rail 11 with sandwich structures by means of the plug regions 6a' or mating plug regions 6b'.

In a fourth step under M4, the sandwich structure is impregnated with a synthetic resin, and in a fourth step under M5, the sandwich structure which is impregnated with synthetic resin is cured, and a sandwich panel 2 or an integral monument component 12 is thus formed.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A vehicle cabin monument housing construction kit, the kit comprising:
   a plurality of integrally formed sandwich panels, each of the sandwich panels having a first and a second cover panel surrounding a core, and formed with panel connecting structures, each of the panel connecting structures formed as a plug region or as a mating plug region,
   wherein the construction kit further comprises:
   at least one fastening rail having a receiving space extending along the longitudinal direction of the at least one fastening rail, the receiving space being configured to receive and fasten mounting feet of fixing elements to the at least one fastening rail to fix the monument in position inside the cabin,
      wherein the at least one fastening rail is formed with rail-to-panel connecting structures, each of the rail-to-panel connecting structures formed as a plug region or as a mating plug region, and
      wherein the mating plug region of any of the sandwich panels and the at least one fastening rail is formed to be complementary to the plug region of any of the sandwich panels and the at least one fastening rail, and the plug region of any of the sandwich panels and the at least one fastening rail is formed to be complementary to the mating plug region of any of the sandwich panels and the at least one fastening rail, so that the at least one fastening rail is configured to be plugged together with at least one of the plurality of sandwich panels at least one of the plurality of sandwich panels with the plug region is configured to be plugged together with one of the plurality of sandwich panels with the mating plug region.

2. The monument housing construction kit of claim 1, wherein the core of the sandwich panels comprise at least one of reinforcement fibres and layers of reinforcement fibres, the density distribution of the reinforcement fibres is increased at least one of the plug regions and the mating plug regions.

3. The monument housing construction kit of claim 1, wherein the core of the sandwich panels include elongate hollow spaces, each of the hollow spaces extending through the core in a direction substantially parallel to the first and second cover panels.

4. The monument housing construction kit of claim 1, wherein at least two of the sandwich panels are formed integrally with one another so as to form a monument component.

5. The monument housing construction kit of claim 1, wherein the at least one fastening rail is formed with a plurality of regularly spaced holes in the receiving space, the holes being configured to receive and fasten mounting feet of fixing elements to the at least one fastening rail.

6. The monument housing construction kit of claim 1, wherein the at least one fastening rail is in the form of a seat rail.

7. The monument housing construction kit of claim 1, wherein the at least one fastening rail is formed substantially from fibre-reinforced plastics material, and at least two of the sandwich panels are formed integrally together with the at least one fastening rail located therebetween to form a monument component.

8. A vehicle cabin monument comprising a housing structure which is formed with a construction kit, the construction kit comprising:
   a plurality of integrally formed sandwich panels, each of the sandwich panels having a first and a second cover panel surrounding a core, and formed with panel connecting structures, each of the panel connecting structures formed as a plug region or as a mating plug region,
   wherein the construction kit further comprises:
   at least one fastening rail having a receiving space extending along the longitudinal direction of the at least one fastening rail, the receiving space being configured to receive and fasten mounting feet of fixing elements to the at least one fastening rail to fix the monument in position inside the cabin,
   wherein the at least one fastening rail is formed with rail-to-panel connecting structures, each of the rail-to-panel connecting structures formed as a plug region or as a mating plug region, and
   wherein the mating plug region of any of the sandwich panels and the at least one fastening rail is formed to be complementary to the plug region of any of the sandwich panels and the at least one fastening rail, and the plug region of any of sandwich panels and the at least one fastening rail is formed to be complementary to the mating plug region of any of the sandwich panels and the at least one fastening rail, so that the fastening rail is configured to be plugged together with at least one of the plurality of sandwich panels and one of the plurality of sandwich panels with the plug region is configured to be plugged together with one of the plurality of sandwich panels with the mating plug region.

9. An aircraft or spacecraft, comprising:
   a cabin; and
   a monument comprising a housing structure formed with a construction kit comprising:
   a plurality of integrally formed sandwich panels, each of the sandwich panels having a first and a second cover panel surrounding a core, and formed with panel connecting structures, each of the panel connecting structures formed as a plug region or as a mating plug region;
   at least one fastening rail having a receiving space extending along the longitudinal direction of the fastening rail, the receiving space being configured to receive and fasten mounting feet of fixing elements to the fastening rail to fix the monument in position inside the cabin, and a fixing element connected to a structure of the aircraft or spacecraft and having mounting feet mounted at a distance from one another in the fastening rail of the monument, and the fixing element configured to fix the monument in a position inside the cabin, wherein the at least one fastening rail is formed with rail-to-panel connecting structures, each of the rail-to-panel connecting structures formed as a plug region or as a mating plug region, and wherein the mating plug region of any of the sandwich panels and the at least one fastening rail is formed to be complementary to the plug region any of the sandwich panels and the at least one fastening rail, and the plug region of any of the sandwich panels and the at least one fastening rail is formed to be complementary to the mating plug region of the sandwich panels and the at least one fastening rail, so that the at least one fastening rail is configured to be plugged together with at least one of the plurality of sandwich panels and one of the plurality of sandwich panels with the plug region is configured to be plugged together with one of the plurality of sandwich panels with the mating plug region.

10. A method of producing a vehicle cabin monument housing construction kit, the method comprising:

arranging two cover panels made of fibre composite semi-finished products around a core made of a foam to form a sandwich structure;

inserting prefabricated panel connecting structures made of fibre composite semi-finished products in the sandwich structure to form plug regions or mating plug regions;

impregnating the sandwich structure with a synthetic resin; and curing the sandwich structure impregnated with synthetic resin and forming a sandwich panel, wherein the step of plugging together comprises introducing a fastening rail made of a fibre composite semi-finished product having prefabricated rail-to-panel connecting structures, the pre-fabricated rail-to-panel connecting structures forming plug regions or mating plug regions, and plugging together the fastening rail with sandwich structures.

11. The method of claim 10, wherein the method further comprises plugging together a plurality of sandwich structures via the plug regions and the mating plug regions, and wherein the curing of the sandwich structures impregnated with synthetic resin and plugged together comprises forming an integral monument component.

12. The method of claim 10, wherein the step of arranging comprises at least one of sewing up the core with a plurality of reinforcement fibres and introducing a plurality of layers of reinforcement fibres, and wherein a density distribution of the reinforcement fibres in the core is increased at least one of the plug regions and the mating plug regions.

13. The method of claim 10, wherein the step of arranging comprises forming elongate hollow spaces in the core of the sandwich structures, the hollow spaces each extending through the core in a direction substantially parallel to the cover plates.

* * * * *